(12) United States Patent
Col et al.

(10) Patent No.: US 7,065,632 B1
(45) Date of Patent: Jun. 20, 2006

(54) METHOD AND APPARATUS FOR SPECULATIVELY FORWARDING STOREHIT DATA IN A HIERARCHICAL MANNER

(76) Inventors: Gerard Col, 11008 Conchos Tr, Austin, TX (US) 78726; G. Glenn Henry, 411 Lake Cliff Trail, Austin, TX (US) 78746; Rodney Hooker, 9408 Big View Dr., Austin, TX (US) 78730

( * ) Notice: Subject to any disclaimer, the term of this patent is extended or adjusted under 35 U.S.C. 154(b) by 0 days.

(21) Appl. No.: 09/545,040

(22) Filed: Apr. 7, 2000

(51) Int. Cl.
G06F 15/00 (2006.01)

(52) U.S. Cl. .................................... 712/218

(58) Field of Classification Search ................ 712/218
See application file for complete search history.

(56) References Cited

U.S. PATENT DOCUMENTS

| | | | | |
|---|---|---|---|---|
| 5,487,156 A | * | 1/1996 | Popescu et al. | 712/217 |
| 5,561,776 A | * | 10/1996 | Popescu et al. | 712/239 |
| 5,588,126 A | * | 12/1996 | Abramson et al. | 712/200 |
| 5,606,670 A | * | 2/1997 | Abramson et al. | 711/154 |
| 5,625,837 A | * | 4/1997 | Popescu et al. | 712/23 |
| 5,627,983 A | * | 5/1997 | Popescu et al. | 712/217 |
| 5,671,444 A | * | 9/1997 | Akkary et al. | 710/52 |
| 5,751,983 A | * | 5/1998 | Abramson et al. | 712/216 |
| 5,832,293 A | * | 11/1998 | Popescu et al. | 712/23 |
| 5,933,844 A | * | 8/1999 | Young | 711/3 |
| 6,065,103 A | * | 5/2000 | Tran et al. | 711/156 |
| 6,141,747 A | * | 10/2000 | Witt | 712/225 |
| 6,349,382 B1 | * | 2/2002 | Feiste et al. | 712/216 |
| 6,360,298 B1 | * | 3/2002 | Osanai et al. | 711/133 |

(Continued)

OTHER PUBLICATIONS

Hennessy, John L. and Patterson, David A. Computer Architecture A Quantitative Approach. Second Edition. San Francisco, California: Morgan Kaufmann Publishers, Inc. ©1996 pp. 139 and 152-155.*

(Continued)

*Primary Examiner*—Eddie Chan
*Assistant Examiner*—Aimme Li

(57) ABSTRACT

An apparatus for speculatively forwarding storehit data in a microprocessor pipeline. First and second virtual address comparators compare a virtual load address with first and second virtual store addresses to generate a virtual match signal for indicating whether first and second storehit data is likely present in a store buffer and a result forwarding cache, respectively. If the first and second storehit data are both present the second storehit data is newer than the first storehit data. First and second physical address comparators compare a physical load address translated from the virtual load address with first and second physical store addresses translated from the plurality of virtual store addresses to generate a physical match signal for indicating whether the first and second storehit data is certainly present in the store buffer and the result forwarding cache, respectively. Forwarding logic forwards the second storehit data present in the store buffer in response to the virtual match signal indicating no match between the virtual load address and the second virtual store addresses but a match between the virtual load address and the first virtual store address, prior to generation of the physical match signal. Control logic receives the virtual and physical match signals and generates a stall signal for stalling the pipeline subsequent to the forwarding logic forwarding the storehit data From the store buffer if the physical match signal indicates a match between the physical load address and the second physical store addresses although the virtual match signal previously indicated no match between the virtual load address and the second virtual store addresses, until correct data specified by the physical load address is provided to replace the previously forwarded second storehit data.

15 Claims, 8 Drawing Sheets

U.S. PATENT DOCUMENTS 6,662,280 B1 * 12/2003 Hughes .................. 711/156

OTHER PUBLICATIONS

Popescu, Val; Schultz, Merie; Spracklen, John; Gibson, Gary; Lightner, Bruce; and Isaman, David. "The Metaflow Architecture". IEEE Micro. ©1991.*

Preiss, Bruno R. "Direct vs. Indirect Containment". ©1997. http://www.brpreiss.com/books/opus4/html/page123.html*

Instant Web. "Online Computing Dictionary". ©1997. http://www.instantweb.com/foldoc/foldoc.cgi?computer+dictionary Search Term: Cache.*

* cited by examiner

FIG. 5

Forwarding from RFC

| Cycle | Address (A) | Data (D) | Sec'y Data (G) | Execution (E) | Store (S) | Write-back (WB) | Store Buffers (SB) |
|---|---|---|---|---|---|---|---|
| 1 | st [MA1], R2 | | | | | | |
| 2 | nop | st [MA1], R2 | | | | | |
| 3 | ld R3, [MA1] | nop | st [MA1], R2 | | | | |
| 4 | | ld R3, [MA1] | nop | st [MA1], R2 | | | |
| 5 | | | ld R3, [MA1] | nop | st [MA1], R2 | | |
| 6 | | | | ld R3, [MA1] | nop | st [MA1], R2 | |
| 7 | | | | | ld R3, [MA1] | nop | st [MA1], R2 |
| 8 | | | | | | ld R3, [MA1] | |

Note: The load/store instructions specify the same virtual load/store address.
Clock 4, E-stage: Result data destined for memory also written into RFC.
Clock 5, G-stage: Result data specified by load instruction forwarded from RFC.

Forwarding from Store Buffer

| Cycle | Address (A) | Data (D) | Sec'y Data (G) | Execution (E) | Store (S) | Write-back (WB) | Stor Buffers (SB) |
|---|---|---|---|---|---|---|---|
| 1 | st [MA1], R2 | | | | | | |
| 2 | st [MA1], R3 | st [MA1], R2 | | | | | |
| 3 | add R4, R5, R4 | st [MA1], R3 | st [MA1], R2 | | | | |
| 4 | add R7, R8, R7 | add R4, R5, R4 | st [MA1], R3 | st [MA1], R2 | | | |
| 5 | sub R4, R5, R4 | add R7, R8, R7 | add R4, R5, R4 | st [MA1], R3 | st [MA1], R2 | | |
| 6 | sub R7, R8, R7 | sub R4, R5, R4 | add R7, R8, R7 | add R4, R5, R4 | st [MA1], R3 | st [MA1], R2 | |
| 7 | ld R9, [MA1] | sub R7, R8, R7 | sub R4, R5, R4 | add R7, R8, R7 | add R4, R5, R4 | st [MA1], R3 | st [MA1], R2 |
| 8 | | ld R9, [MA1] | sub R7, R8, R7 | sub R4, R5, R4 | add R7, R8, R7 | add R4, R5, R4 | st [MA1], R3 |
| 9 | | | ld R9, [MA1] | sub R7, R8, R7 | sub R4, R5, R4 | add R7, R8, R7 | |
| 10 | | | | ld R9, [MA1] | sub R7, R8, R7 | sub R4, R5, R4 | |
| 11 | | | | | ld R9, [MA1] | sub R7, R8, R7 | |
| 12 | | | | | | ld R9, [MA1] | |

FIG. 6

Note: The load/store instructions specify the same load/store address.
Clock 7, E-stage: Result data of first store instruction from R2 destined for memory written into first store buffer.
Clock 8, E-stage: Result data of second store instruction from R3 destined for memory written into second store buffer.
Clock 9, G-stage: Result data specified by load instruction forwarded from second store buffer.

FIG. 7

Speculative Forwarding with Correction Due to Virtual Aliasing Condition

| Cycle | Address (A) | Data (D) | Sec'y Data (G) | Execution (E) | Store (S) | Write-back (WB) | Store Buffers (SB) |
|---|---|---|---|---|---|---|---|
| 1 | st [MA1], R2 | | | | | | |
| 2 | ld R4, [MA2] | st [MA1], R2 | | | | | |
| 3 | | ld R4, [MA2] | st [MA1], R2 | | | | |
| 4 | | | ld R4, [MA2] | st [MA1], R2 | | | |
| 5 | | | | ld R4, [MA2] | st [MA1], R2 | | |
| 6 | | | | ld R4, [MA2] | | st [MA1], R2 | |
| 7 | | | | ld R4, [MA2] | | | st [MA1], R2 |
| n-1 | | | | ld R4, [MA2] | | | |
| n | | ld R4, [MA2] | | | | | |
| n+1 | | | ld R4, [MA2] | | | | |
| n+2 | | | | ld R4, [MA2] | | | |
| n+3 | | | | | ld R4, [MA2] | | |
| n+4 | | | | | | ld R4, [MA2] | |

Note: The load/store instructions specify different virtual load/store addresses that translate to the same physical address.
Clock 5, E-stage: Data from data unit speculatively forwarded to E-stage load instruction.
Clocks 5 through n-1, E-stage: Load instruction in stalled E-stage while store instruction data written to data cache.
Clock 7, Store Buffers: Result data of store instruction destined for memory written into store buffer.
Clock n, D-stage: Load instruction reissued within data unit.
Clock n+1, G-stage: Load instruction generates hit in data cache.

FIG. 8

Speculative Forwarding with Correction Due to Access of Non-Cacheable Region

| Cycle | Address (A) | Data (D) | Sec'y Data (G) | Execution (E) | Store (S) | Write-back (WB) | Stor Buff rs (SB) |
|---|---|---|---|---|---|---|---|
| 1 | st [MA1], R2 | | | | | | |
| 2 | nop | st [MA1], R2 | | | | | |
| 3 | ld R3, [MA1] | nop | st [MA1], R2 | | | | |
| 4 | | ld R3, [MA1] | nop | st [MA1], R2 | | | |
| 5 | | | ld R3, [MA1] | nop | st [MA1], R2 | | |
| 6 | | | | ld R3, [MA1] | nop | st [MA1], R2 | |
| 7 | | | | ld R3, [MA1] | | nop | st [MA1], R2 |
| n-1 | | | | ld R3, [MA1] | | | |
| n | | | | | ld R3, [MA1] | | |
| n+1 | | | | | | ld R3, [MA1] | |
| n+2 | | | | | | | |

Note: The load/store instructions specify the same virtual load/store address which translates to a physical address in a non-cacheable region.

Clock 6, E-stage: Storehit data from RFC speculatively forwarded to E-stage load instruction.

Clocks 6 through n-1, E-stage: Load instruction stalled in E-stage while data specified by load instruction is fetched from I/O device or system memory into a response buffer.

Clock n, E-stage: Data requested by load instruction selected from response buffer.

METHOD AND APPARATUS FOR SPECULATIVELY FORWARDING STOREHIT DATA IN A HIERARCHICAL MANNER

BACKGROUND OF THE INVENTION

1. Field of the Invention

This invention relates in general to the field of pipelined microprocessors, and more particularly to forwarding storehit data between stages of microprocessor pipelines.

2. Description of the Related Art

A microprocessor has an instruction pipeline that sequentially executes instructions from an application program in synchronization with a microprocessor clock. The instruction pipeline is divided into stages, each of which performs a specific task that is part of an overall operation that is directed by a programmed instruction. The programmed instructions in a software application program are executed in sequence by the microprocessor. As an instruction enters the first stage of the pipeline, certain tasks are accomplished. The instruction is then passed to subsequent stages for accomplishment of subsequent tasks. Following completion of a final task, the instruction completes execution and exits the pipeline. Execution of programmed instructions by a pipeline microprocessor is very much analogous to the manufacture of items on an assembly line.

Early pipeline microprocessors were not sophisticated enough to have multiple instructions executing in different pipeline stages at the same time. Consequently, a given instruction would be fetched from memory and would proceed through the various pipeline stages until it completed execution. Following this, a next instruction would proceed through the various stages through completion. And because early pipeline microprocessors had only a few pipeline stages, the inefficient utilization of stage resources was not deemed to be significant.

As uses for microprocessors started to proliferate, more stringent requirements began to be imposed, particularly with respect to speed. The obvious approach for increasing processing speed was to allow multiple instructions to simultaneously proceed down the pipeline at the same time. Clearly, this change increased instruction throughput because resources within each pipeline stage were more efficiently used. But with this change came a problem: What if one instruction executing in an early pipeline stage required a result that was yet to be provided by another instruction executing in a later pipeline stage?

This situation is common to software programs; instructions that are close in proximity tend to perform tasks using the same operand. For example, a control algorithm may compute a true error signal value by adding a small number to a current error signal value and then comparing this value to some other signal that is input to the microprocessor. The structure of the algorithm is to add a first operand to a second operand to produce a result. The result is then tested to see if the computed value is tolerable. If not, then the first operand is added to the computed result to obtain a second result. The second result is tested, and so on. Even in this simple algorithm, it is evident that every other instruction utilizes the last computed result. When a given instruction executing in one stage of the pipeline requires a result that is to be provided by another instruction executing in a subsequent stage of the pipeline, the given instruction is referred to as a dependent instruction. This is because the operand required by the dependent instruction depends upon generation of the result by the other instruction.

To deal with dependent instructions, microprocessor designers added interlock logic to existing pipeline designs. The interlock logic spanned the stages of a microprocessor where the dependency situation could occur. During normal operation, non-dependent instructions were successively advanced through the pipeline stages in synchronization with the clock. When the interlock logic encountered a dependent instruction, it simply stalled execution of the dependent instruction by inserting slips into the pipeline, until the result required by the dependent instruction was generated and made available for retrieval as an operand.

In spite of the advances provided through interlock logic, demands for faster throughput continued to press microprocessor designers. Consequently, an alternative to interlock logic was developed that allowed dependent instructions to proceed down the pipeline without incurring slips. This alternative is known as a result distribution bus, or a bypass bus, or a result forward bus. In essence, the result distribution bus originates at the stage of the pipeline in which results are generated. When a result is generated, it is copied to the bus and then routed to all of the earlier stages that are affected by dependent instructions. If a dependent instruction is present within any of the earlier stages, then logic within that stage performs all of the operations necessary to properly configure the required operand from the provided result. The result distribution approach can be thought of as a one-to-many distribution scheme because one result can be distributed to several dependent instructions at the same time.

The result distribution scheme has prevailed as the principal technique for expediting the execution of dependent instructions, until more recent times, when demands for further throughput increases have compelled microprocessor designers to substantially alter the design of stages within the pipeline. These alterations to the pipeline can be comprehended through use of an assembly line analogy. Suppose an assembly line is set up with three stages, where each of the three stages is required to insert two screws in a product that flows down the line, for a total of six screws. Further suppose that the time required to insert a screw is one minute. To send a product through the assembly line, then, requires six minutes. If multiple products are sent down the line, then it follows that one product rolls off the line every two minutes.

A simple enhancement to the line will double the production throughput: Reconfigure the line into six stages, where each stage is required to insert only one screw. While with this architectural change it still takes six minutes to pass a product through the line, the improvement now is that one product rolls off of the line every minute. The speed and throughput are doubled by doubling the number of stages and halving the operations performed in each stage.

To improve the throughput of current microprocessors, designers are taking the very same approach: pipeline stages are being added and the functional requirements for each stage are being decreased. Thus, faster clock speeds can be applied and instruction throughput is increased.

But increasing the number of pipeline stages has highlighted a deficiency with the result distribution technique for dealing with dependent instructions. Whereas early microprocessor pipelines consisted of only a few stages, the attendant logic required to implement a result distribution bus was not much of an issue. But for every added stage in the execution pipeline, an additional set of result distribution logic must be provided. In other words, the logic required to implement a result distribution bus is directly proportional to the number of stages that required distribution of the result.

Add to this the fact that the presence of more stages requires logic elements that drive the result signals to be more powerful. Moreover, the timing to distribute results to multiple pipeline stages is not only a function of the number of stages, but is also a based upon the location of the stage that is physically farthest from the origination stage. Hence, circuit complexity, power, and timing problems arise when a result distribution scheme is applied to more advanced pipeline architectures that have more pipeline stages.

One situation in which one instruction executing in an higher pipeline stage requires a result generated by a preceding instruction executing in a lower pipeline stage is referred to as a storehit condition. A storehit condition exists when a load instruction requests data generated as the result of a store instruction executing ahead of the load instruction in the pipeline. That is, the load instruction specifies a load address for load data, wherein the load address matches a store address for store data specified by a previous store instruction, and the store data is still in the microprocessor pipeline, i.e., has not yet been updated in the microprocessor data cache.

In a storehit condition, the load instruction must be provided with coherent data, i.e., the newest data associated with the load address. Thus, the microprocessor cannot supply the data from its data cache or go to system memory to get the data since the newest data is within the pipeline and not in the data cache or system memory. Hence, either the microprocessor stalls to wait for the storehit data to be updated in the data cache, or it forwards the data using one of the techniques described above. Neither alternative is desirable for the reasons described above.

It has been observed that storehit conditions occur relatively frequently in modern microprocessors, particularly in x86 microprocessors. This phenomenon is largely attributed to the fact that modern compilers recognize the relatively small number of registers available in the x86 register file and the fact that virtually every contemporary x86 processor has a large built-in data cache that is essentially accessible at the same speed as the register file. Therefore, when the compilers run out of registers in the register file, they use the data cache as a huge register file. In particular, compilers have been observed to generate code that causes storehit conditions in the following situations: where a loop counter variable is stored in a memory location; where a memory location is used as a temporary location for a sequence of arithmetic operations; and where a stack location is accessed within a very short instruction sequence due to the calling of a very short subroutine, i.e., a push of the return address, followed by a jump to the subroutine, followed by a very small number of instructions of the subroutine, followed by a pop of the return address generating a storehit on the location of the return address.

The storehit data may be forwarded from within the microprocessor pipeline if the data is cacheable. However, microprocessors provide a means for accessing I/O devices, such as DMA controllers, disk controllers, modems, etc. I/O devices typically include status and control registers that are read and written by the microprocessor. Some microprocessors, such as x86 processors, have dedicated instructions for accessing the registers of I/O devices, such as the x86 "in" and "out" instructions. These instructions address a separate address space of the processor bus, namely the I/O space.

The other way I/O devices are accessed is by mapping them into the memory address space of the processor. Such an I/O device is referred to as a memory-mapped I/O device and the region in which the I/O device is mapped is referred to as a memory-mapped I/O region. That is, an I/O device resides within a portion of the microprocessor memory address space, thereby enabling system software, such as device drivers, to access the I/O device.

Typically, memory-mapped I/O regions are non-cacheable. That is, stores to a memory-mapped I/O region may not be cached to satisfy a load from the same location in the memory-mapped I/O region. An example of a non-cacheable memory-mapped I/O access occurs when a first instruction writes a value to an I/O register and the next instruction reads from an I/O register on the same device, such as a store to a memory-mapped I/O region followed by a load from the same memory-mapped I/O region. Due to the nature of I/O devices, in order to insure proper operation of the I/O device, the two instructions must be guaranteed to execute in order. That is, the read cannot be executed until the write has completed to the I/O device. Thus, a microprocessor must ensure that it does not forward storehit data within the microprocessor where the load/store address is in a non-cacheable region.

A final situation relevant to storehit forwarding is referred to as virtual aliasing. Virtual aliasing arises from the fact that most modern microprocessors support the notion of virtual memory. That is, the microprocessor supports a virtual address space that is much larger than the physical address space that the processor is capable of addressing. Consequently, a situation may arise where two different virtual addresses map, or translate, to a single physical address. In particular, a virtual aliasing condition occurs when a match is detected based on a comparison of the physical load and store addresses, but a match is not detected based on a comparison of the virtual load and store addresses.

Therefore, what is needed is an apparatus in a pipelined microprocessor that provides high performance storehit detection and forwarding, taking into account non-cacheable region accesses and virtual aliasing conditions.

SUMMARY OF THE INVENTION

To address the above-detailed deficiencies, it is an object or the present invention is to provide an apparatus for detecting and forwarding storehit data without delay that is less complex than has heretofore been provided. Accordingly, in attainment of the aforementioned object, it is a feature of the present invention to provide an apparatus for speculatively forwarding storehit data in a microprocessor pipeline. The apparatus includes first and second virtual address comparators that compare a virtual load address with first and second virtual store addresses to generate a virtual match signal for indicating whether first and second storehit data is likely present in a store buffer and a result forwarding cache, respectively, of the microprocessor. If the first and second storehit data are both present the second storehit data is newer than the first storehit data. The apparatus also includes first and second physical address comparators that compare a physical load address translated from the virtual load address with first and second physical store addresses translated from the plurality of virtual store addresses to generate a physical match signal for indicating whether the first and second storehit data is certainly present in the store buffer and the result forwarding cache, respectively. The apparatus also includes forwarding logic, coupled to receive the virtual match signal, which forwards the second storehit data present in the store buffer in response to the virtual match signal indicating no match between the virtual load address and the second virtual store addresses but a match between the virtual load address and the first virtual store address, prior to generation of the physical match signal. The apparatus also includes control logic that receives the virtual and physical match signals and generates a stall signal for stalling the pipeline subsequent to the forwarding logic forwarding the storehit data from the store buffer if the physical match signal indicates a match between the physical load address and the second physical store addresses although the virtual match signal previously indicated no match between the virtual load address and the second virtual store addresses, until correct data specified by the physical load address is provided to replace the previously forwarded second storehit data.

In yet another aspect, it is a feature of the present invention to provide a method for speculatively forwarding storehit data in a microprocessor pipeline. The method includes determining that a virtual load address matches a first virtual store addresses present in the pipeline to indicate first storehit data is likely present in a store buffer of the microprocessor, but does not match a second virtual store address present in the pipeline to indicate second newer storehit data is likely absent in a result forwarding cache of the microprocessor. The method also includes forwarding the first storehit data from a first stage comprising the store buffer to a second stage of the pipeline having a load instruction specifying the load address based on the determining that the first storehit data is likely present in the store buffer and the second newer storehit data is likely absent in the result forwarding cache. The method also includes detecting that a physical load address translated from the virtual load address matches a physical store address translated from the second virtual store address to indicate the second newer storehit data is certainly present in the result forwarding cache, subsequent to the forwarding the first storehit data. The method also includes stalling the pipeline in response to the detecting that the physical load address translated from the virtual load address matches the physical store address present in the pipeline, until correct data specified by the physical load address is provided to replace the previously forwarded second newer storehit data.

In yet another aspect, it is a feature of the present invention to provide a method for speculatively forwarding storehit data in a microprocessor pipeline. The method includes comparing a virtual load address with first and second virtual store addresses. A load instruction specifying the virtual load address is newer than a first store instruction specifying the first virtual store address, which is newer than a second store instruction specifying the second virtual store address. The method also includes speculatively forwarding a result of the first store instruction to the load instruction, in response to the comparing indicating the virtual load address matches the first virtual store address and mismatches the second virtual store address. The method also includes comparing a physical load address with a physical store address, wherein the physical load address is a translation of the virtual load address. The physical store address is a translation of the second virtual store address. The method also includes determining the forwarding the result of the first store instruction to the load instruction was incorrect, after the speculatively forwarding the result of the first store instruction, in response to the comparing indicating the physical load address matches the physical store address. The method also includes forwarding a result of the second store instruction to the load instruction, in response to the determining.

An advantage of the present invention is that only minimal changes are required to forward storehit data when pipeline stages are added. Another advantage or the present invention is that it realizes the timing advantages of comparing virtual addresses that are available sooner than physical addresses, in order to detect storehits, and speculatively forwarding data accordingly.

BRIEF DESCRIPTION OF THE DRAWINGS

These and other objects, features, and advantages of the present invention will become better understood with regard to the following description, and accompanying drawings where:

FIGS. 5 through 8 are tables with exemplary instruction sequences illustrating operation of the microprocessor of FIG. 1 according to the flowcharts of FIGS. 3 and 4 according to the present invention.

DETAILED DESCRIPTION

Figure 1:
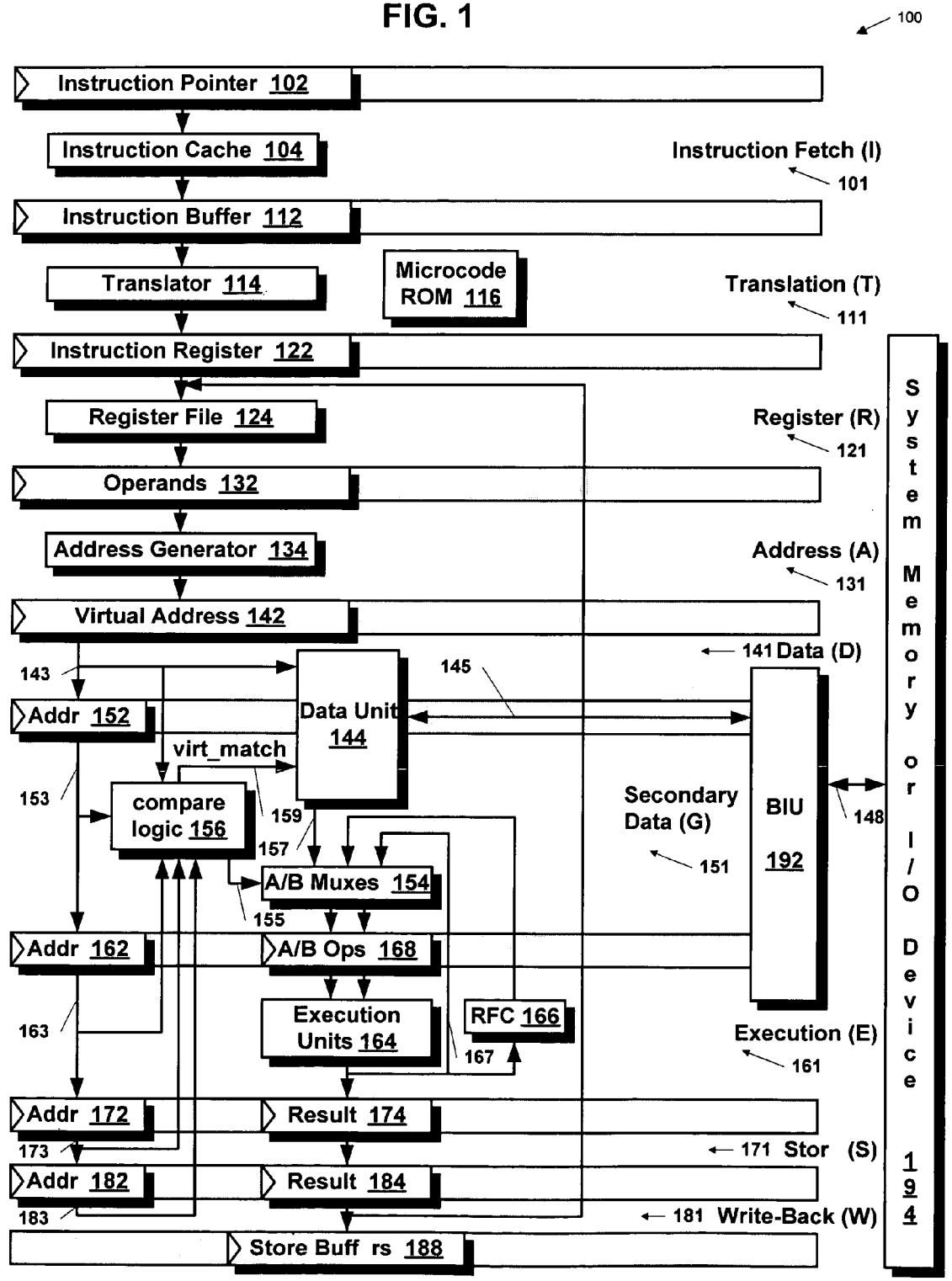
FIG. 1 is a block diagram of a pipelined microprocessor according to the present invention.

Referring to FIG. 1, a block diagram of a pipelined microprocessor 100 according to the present invention is shown. The microprocessor 100 comprises various pipeline stages including: Instruction Fetch (I) stage 101, Translation (T) stage 111, Register (R) stage 121, Address (A) stage 131, Data (D) stage 141, Secondary Data (G) stage 151, Execution (E) stage 161, Store (S) stage 171 and Write-Back (W) stage 181. Instructions enter at the top of the pipeline -100 in the I-stage 101 and exit, i.e., are retired, at the bottom of the pipeline in the W-stage 181 where the microprocessor 100 state is updated.

The I-stage 101 comprises an instruction pointer register 102 that stores a memory address of the next instruction, or cache line containing the next instruction, to be fetched from an instruction cache 104 coupled to the instruction pointer 102. The instruction cache 104 is a memory, such as an L1 cache, that caches previously fetched program instructions from a system memory 194 coupled to the microprocessor 100 by a processor bus 148. Preferably, the system memory 194 comprises a hierarchical memory system, such as a main dynamic random access memory (DRAM) and an L2 cache memory. Instructions fetched from the instruction cache 104 are placed into an instruction buffer 112 coupled to the instruction cache 104.

The T-stage 111 comprises a translator 114, coupled to the instruction buffer 112, which translates program macroinstructions into microinstructions, such as load and store instructions. A load instruction loads data from memory, or I/O device 194 such as a disk controller, DMA controller, etc., into the microprocessor 100. A store instruction stores data from the microprocessor 100 into memory or I/O device 194. Preferably, the macroinstructions are x86 instructions. The microinstructions are simpler instructions than the macroinstructions that may be quickly executed by the various stages of the microprocessor 100. A single macroinstruction may be translated by translator 114 into multiple microinstructions.

In one embodiment, T-stage 111 translates macroinstructions into ld-alu (load data and perform arithmetic/logical operation on the loaded data) or ld-alu-st (load data, perform arithmetic/logical operation, store result) microinstructions.

The generation of ld-alu and ld-alu-st instructions is described in more detail in U.S. Pat. No. 6,338,136 entitled, PAIRING OF LOAD-ALU-STORE WITH CONDITIONAL BRANCH, having the same assignee, which is hereby incorporated by reference. Ld-alu instructions may be referred to herein as load instructions and ld-alu-st instructions may be referred to herein as load and/or store instructions in that they load data from or store data to memory or I/O device 194.

The T-stage 111 further comprises a microcode ROM (read-only-memory) 116. Some macroinstructions, typically complex or infrequently executed macroinstructions, are performed by microinstruction sequences comprised in the microcode ROM 116 rather than by microinstructions translated by the translator 114. Additionally, microcode ROM 116 comprises microinstruction sequences for handling exceptions, such as page faults, interrupts, arithmetic errors and so forth.

The R-stage 121 comprises a register file 124 that stores the program-visible state of the microprocessor 100. Preferably, the register file 124 comprises a register set compatible with the x86 architecture. The register file 124 comprises operand registers used to calculate addresses, such as memory addresses used to access data in memory 194. Instructions and the operands specified thereby are placed in a register 132 for use by the A-stage 131.

The A-stage 131 comprises an address generator 134 that receives operands from register 132 and generates addresses from the operands for storage in a register 142. Preferably, the addresses generated by address generator 134 are linear, or virtual, addresses for addressing data or instructions in memory 194 as defined by the x86 architecture. The data addresses are piped down the pipeline 100 stages via address registers 152, 162, 172 and 182.

The microprocessor 100 further comprises a data unit 144 that stores and loads data to and from memory 194. The data unit 144 also caches the data received from memory 194. Furthermore, the data unit 144 forwards storehit data from store buffers 188 to a pair of multiplexers 154 for consumption by execution units 164.

The data unit 144 is coupled to a bus interface unit 192 via signals 145. The bus interface unit 192 couples microprocessor 100 to system memory 194 via processor bus 148. Preferably, bus 148 allows multiple simultaneously outstanding requests for data to or from system memory 194. Preferably, bus 148 also allows outstanding requests to complete on bus 148 out of order with respect to the order the requests were issued.

The data unit 144 receives data addresses generated by address generator 134 via signals 143. The data unit 144 provides data, including storehit data, to multiplexers 154 via signals 157. In particular, the data unit 144 receives load and store instruction addresses and provides data to operand registers 168 via multiplexers 154 for the execution units 164 based on the load and store addresses. Preferably, register 168 comprises dual registers for two operands, referred to as operands A and B.

In one embodiment, data accesses within data unit 144 require two processor clock cycles. Consequently, microprocessor 100 comprises both the D-stage 141 and the G-stage 151 for data accesses. Register 152 and register 162 store addresses associated with instructions proceeding down the pipeline 100 through the D-stage 141 and G-stage 151, respectively. The data unit 144 will be described in more detail with respect to FIG. 2 below.

As shown, data is provided to operand registers 168 from three sources: data unit 144, a result forwarding cache (RFC) 166, and directly from execution units 164 via signal 167. Operation of the RFC is completely described in U.S. Pat. No. 6,343,359 entitled "RESULT FORWARDING CACHE", assigned to a common assignee, which is hereby incorporated by reference. Multiplexers 154 operate to select one of the three data sources for providing operands to operand registers 168 as controlled by compare logic 156. Compare logic 156 compares virtual address 143 with virtual addresses 153, 163, 173 and 183 and controls multiplexers 154 via control signal 155 based on whether a storehit occurred between the G-stage 151 load instruction and any store instructions present in the E-stage 161, S-stage 171 or W-stage 181, based on the virtual address comparison. The control of multiplexers 154 is described below in more detail with respect to FIG. 3.

In addition, compare logic 156 generates a virt_match signal 159 to data unit 144 to indicate whether a storehit occurred between the G-stage 151 load instruction and any store instructions present in the E-stage 161, S-stage 171 or W-stage 181, based on the virtual address comparison, i.e., whether storehit data is present in the E-stage 161 or RFC 166.

The pipeline 100 further comprises an E-stage 161 comprising one or more execution units 164 and RFC 166. Preferably, execution unit 164 comprises an integer arithmetic logic unit, a floating point unit and an MMX unit. Under certain conditions in which storehit data has been speculatively forwarded incorrectly as described below, the pipeline may be stalled from the E-stage 161 upward waiting for the correct data to be forwarded or obtained from the processor bus 148.

The execution unit 164 generates results and places the results in a result register 174. The results are further provided to result register 184 and finally are written back into register file 124 to update the program-visible state of the microprocessor 100 if required by the instruction. If the instruction is a store instruction, the results are provided from result register 184 to one of a plurality of store buffers 188. The data is stored in store buffers 188 until the data unit 144 obtains ownership of bus 148 to write the data to memory 194 or to a data cache within the data unit 144 described below with respect to FIG. 2. In one embodiment, the store buffers are physically located relatively distant from multiplexers 154. The store buffers 188 may be viewed conceptually as included in the data unit 144.

The results generated by execution units 164 are also written into RFC 166. RFC 166 comprises a cache for storing intermediate microinstruction results, including store instruction results. In one embodiment, RFC 166 comprises a first-in-first-out (FIFO) cache memory having five entries for storing intermediate results of five instructions.

The RFC 166 forwards results to multiplexers 154 for selective forwarding to operand registers 168 for consumption by execution units 164. In particular, if compare logic 156 determines that a load address specified by a load instruction in the G-stage 151 matches a store address specified by a store instruction in the S-stage 171 or W-stage 181, then the specified data is provided from RFC 166 to execution units 164 if the data in RFC 166 is the newest data. Forwarding of data from RFC 166 is described in more detail below with respect to FIGS. 3 and 4.

In one embodiment, RFC 166 comprises a result forwarding cache as described in the aforementioned Patent Application modified to store results of store instructions in addition to other intermediate microinstruction results. In one embodiment, the intermediate result destination fields employ R0, a dummy register designation, to denote the result destination is memory 194, i.e., that the result is from a store instruction.

Figure 2:
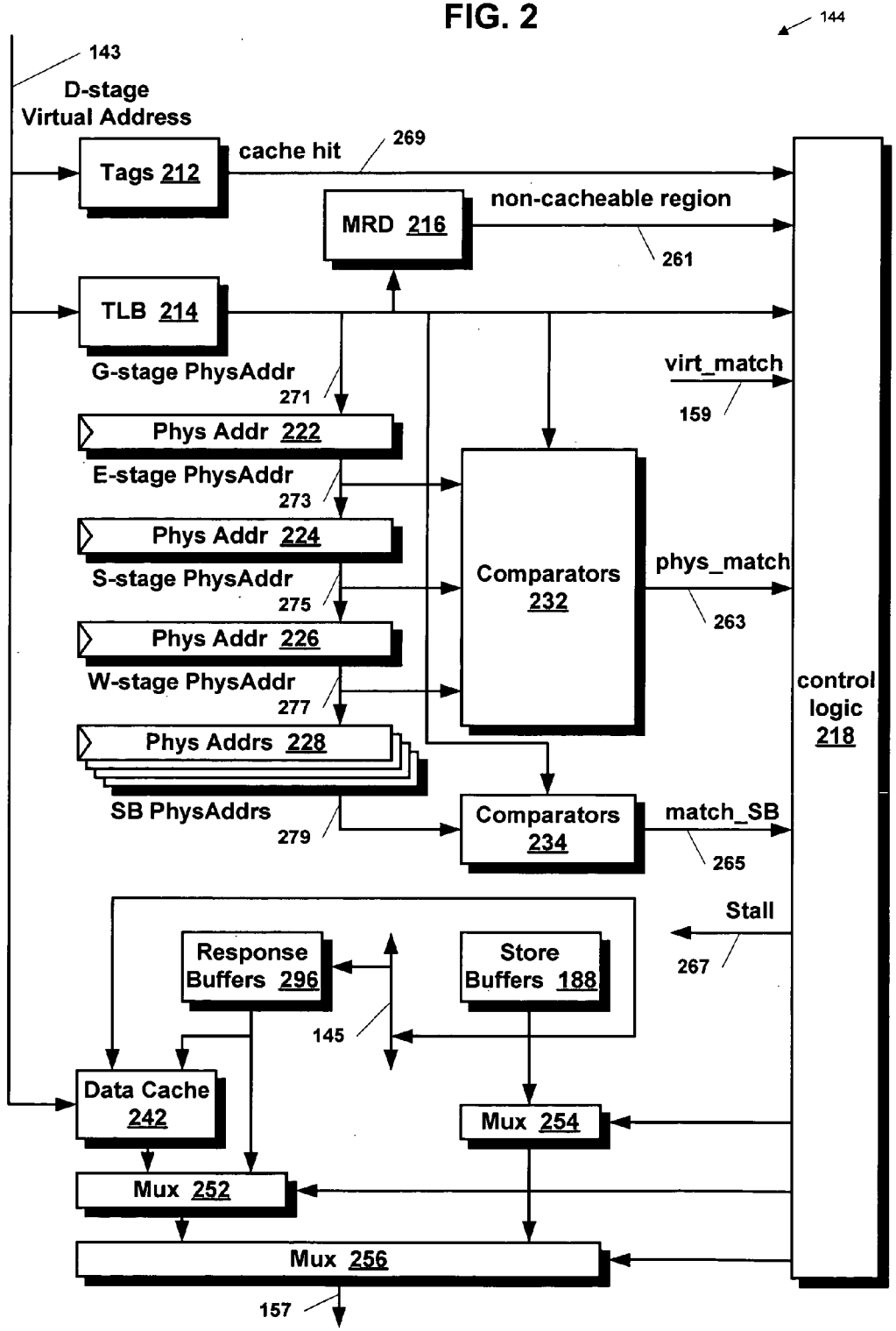
FIG. 2 is a block diagram of the data unit of the microprocessor of FIG. 1 according to the present invention.

Referring now to FIG. 2, a block diagram of the data unit 144 of the microprocessor 100 of FIG. 1 according to the present invention is shown. Data unit 144 comprises a data cache 242 for caching data from memory 194. Preferably, data cache 242 comprises a level one (L1) primary cache. Data cache 242 is indexed by virtual address 143.

Data unit 144 also comprises a cache tag memory 212, that receives virtual address 143, and generates a cache hit signal 269 to indicate whether the data specified by virtual address 143 is present in data cache 242.

Data unit 144 also comprises a translation lookaside buffer (TLB) 214, for translating virtual address 143 into a G-stage 151 physical address 271 provided to a physical address register 222. The physical address 271 generated by TLB 214 is piped down through the data unit 144 via registers 224, 226 and 228. Physical addresses 273, 275, 277 and 279 stored in registers 222 through 228 are the physical addresses for the data of instructions in the E-stage 161, S-stage 171, W-stage 181 and store buffers 188, respectively. Physical addresses 273, 275 and 277 correspond to their virtual address counterparts 163, 173 and 183, respectively.

Data unit 144 also comprises a plurality of comparators 232, for comparing the G-stage physical load address 271 with each of the E-stage physical address 273, S-stage physical address 275 and W-stage physical address 277. Comparators 232 generate a phys_match signal 263 to indicate whether a match occurred between the G-stage load address 271 and the other physical addresses 273, 275 or 277. That is, phys_match signal 263 indicates whether a storehit occurred between the G-stage 151 load instruction and any store instructions present in the E-stage 161, S-stage 171 or W-stage 181, based on a physical address comparison.

Data unit 144 also comprises a plurality of comparators 234, for comparing the G-stage physical load address 271 with each of the store buffers 188 physical addresses 279. Comparators 234 generate a match_SB signal 265 to indicate whether a match occurred between the G-stage load address 271 and the store buffers 188 physical addresses 279, i.e., to indicate whether a storehit occurred between the G-stage 151 load instruction and the store buffers 188, based on a physical address comparison.

Data unit 144 also comprises a plurality of response buffers 296 for receiving data from memory or I/O device 194 via bus interface unit 192 via signals 145 and for storing the data until the data is written to data cache 242.

Data unit 144 also comprises memory region descriptors (MRD) 216, for storing a plurality of physical address ranges. Preferably, for each address range, the descriptors 216 include attributes of the ranges. In particular, the attributes specify whether a particular address range is a cacheable or non-cacheable region. That is, if a load instruction specifies a load address that falls within a region specified in the descriptors 216 as a non-cacheable region, then the microprocessor 100 must not provide the specified data from within the pipeline 100 nor from data cache 242, but instead must fetch the data from memory or I/O device 194. Preferably, the descriptors 216 are software programmable, and are typically programmed by a system BIOS or other operating system software. Typically, the descriptors 216 designated non-cacheable specify regions utilized to communicate with memory mapped I/O devices 194. If a storehit occurs in a non-cacheable region, the storehit data present in the pipeline 100 may not be forwarded. MRD 216 receives G-stage physical address 271 and generates a signal 261 to indicate that a load address 271 has been specified that is within a non-cacheable region.

Data unit 144 also comprises control logic 218, that receives cache hit signal 269, non-cacheable region access signal 261, match_SB signal 265, phys_match signal 263, and virt_match signal 159 from compare logic 156 of FIG. 1, and generates control signals to control multiplexers 252, 254 and 256. In addition, control logic 218 generates a Stall signal 267 to stall the pipeline stages above the S-stage 171, as described below. Control logic 218 maintains status information regarding the order of use of the store buffers 188 in order to know which store buffer 188 has the newest data. That is, if multiple store buffers 188 contain data having the same physical address, control logic 218 is capable of determining from the status information which of the store buffers 188 data was most recently written into. In other words, control logic 218 is capable of determining the order of instructions coming down the pipeline 100 that write data to the same physical address.

Multiplexer 252 comprises two inputs, one from data cache 242 output and another from response buffers 296. Multiplexer 252 selects one of the data sources and provides its output as an input to multiplexer 256.

Multiplexer 254 comprises one input for each of the store buffers 188. Preferably, store buffers 188 comprise four store buffers for storing up to four cache lines of data. Multiplexer 254 selects one of the store buffers 188 and provides its output as an input to multiplexer 256.

Multiplexer 256 receives as inputs the outputs of multiplexers 252 and 254 and selects one of the inputs for provision on signal 157 to multiplexers 154 of FIG. 1. Operation of control logic 218 to control multiplexers 252, 254 and 256 will be described in more detail below.

Figure 3:
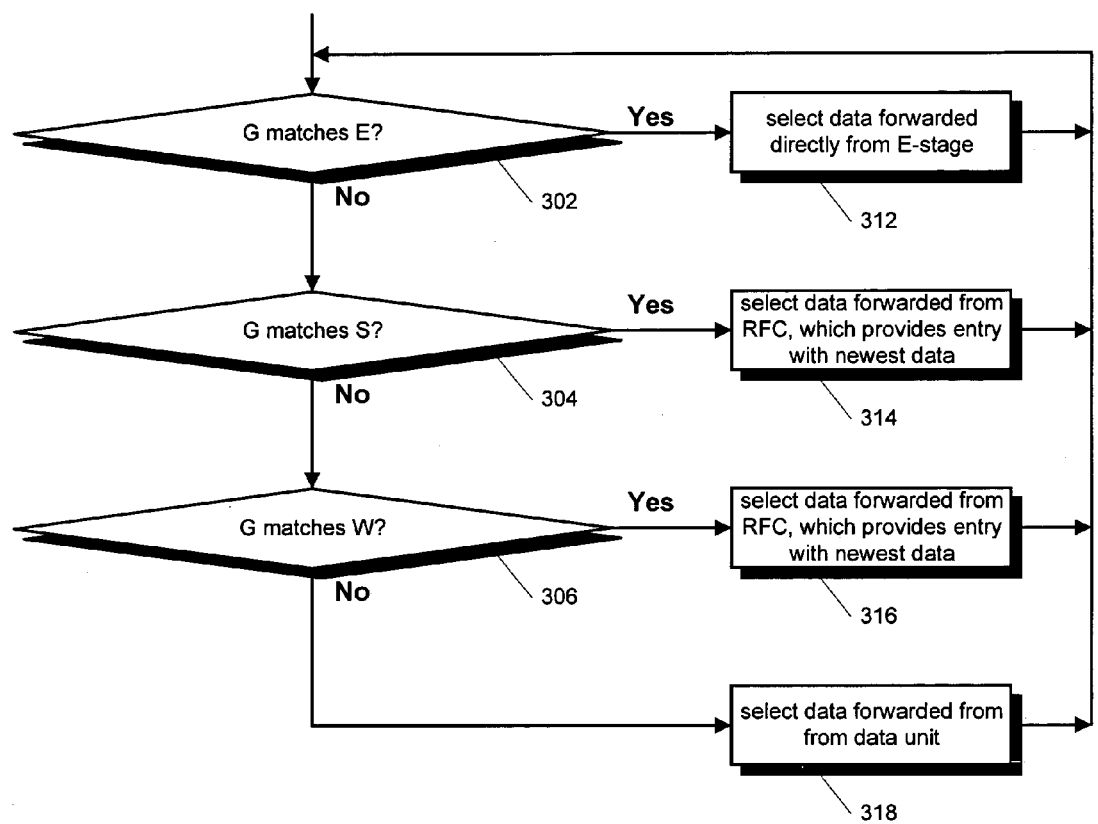
FIG. 3 is a flow chart illustrating operation of the result forwarding cache and compare logic of FIG. 1 according to the present invention.

Referring now to FIG. 3, a flow chart illustrating operation of the result forwarding cache 166 and compare logic 156 of FIG. 1 according to the present invention is shown. Compare logic 156 determines if a load address of a load instruction in the G-stage 151 matches a store address of a store instruction in the E-stage 161, in step 302. If the load address matches the store address, then compare logic 156 controls at least one of multiplexers 154 via signal 155 to select data forwarded directly from execution units 164 via signal 167 as an operand for storage in one of registers 168, in step 312.

As shown in FIG. 1, virtual address 143 is available in the D-stage 141, i.e., a clock cycle earlier than the G-stage 151. Preferably, compare logic 156 determining if a G-stage 151 load address matches an E-stage 161 store address in step 302 comprises comparing virtual address 143 with virtual address 153. That is, the load and store address are compared one clock early, i.e., while the load instruction is in the D-stage 141 and the store instruction is in the G-stage 151 and the comparison results are stored within compare logic 156 for use during the next clock cycle. The one-stage early comparison gives compare logic 156 an extra clock cycle to control other logic within the pipeline 100, such as RFC 166 and control signals 155, thereby easing timing constraints with respect to compare logic 156 and RFC 166. Additionally, the early comparison enables compare logic 156 to determine whether a storehit has occurred one clock sooner than the data unit 144 determines whether a storehit has occurred, as will be observed below with respect to FIG. 4.

Compare logic 156 also determines if a load address of a load instruction in the G-stage 151 matches a store address of a store instruction in the S-stage 171, in step 304. If the G-stage 151 load address does not match the E-stage 161 store address, but the G-stage 151 load address matches the S-stage 171 store address, then compare logic 156 controls at least one of multiplexers 154 via signal 155 to select data forwarded from RFC 166 as an operand for storage in one of registers 168, in step 314. RFC 166 forwards the data stored in the RFC 166 that corresponds to the S-stage 171. That is, RFC 166 forwards the top entry in the FIFO.

Similar to step 302, preferably step 304 comprises comparing virtual address 143 with virtual address 163. That is, the G-stage 151 load address is compared with the S-stage 171 store address one clock cycle earlier than when the instructions arrive in their respective stages and are stored for use in the next clock cycle.

Compare logic 156 also determines if a load address of a load instruction in the G-stage 151 matches a store address of a store instruction in the W-stage 181, in step 306. If the G-stage 151 load address does not match either the E-stage 161 store address nor the S-stage 171 store address, but the G-stage 151 load address matches the W-stage 181 store address, then compare logic 156 controls at least one of multiplexers 154 via signal 155 to select data forwarded from RFC 166 as an operand for storage in one of registers 168, in step 316. RFC 166 forwards the data that corresponds to the W-stage 181. That is, RFC 166 forwards the entry one below the top of the FIFO if the instruction immediately following the W-stage 181 instruction generated a result that was written into RFC 166. However, if the instruction immediately following the W-stage 181 instruction did not generate a result, e.g., a NOP (no operation instruction), and therefore no result was written into RFC 166, then RFC 166 forwards the top entry of the FIFO.

Similar to steps 302 and 304, preferably step 306 comprises comparing virtual address 143 with virtual address 173. That is, the G-stage 151 load address is compared with the W-stage 181 store address one clock cycle earlier than when the instructions arrive in their respective stages and the comparison result is stored for use in the next clock cycle.

If compare logic 156 determines that a G-stage 151 load address does not match a store address of a store instruction in any of the E-stage 161, S-stage 171 or W-stage 181, then control logic 156 controls multiplexer 154 to select data forwarded from data unit 144, in step 318. Operation of data unit 144 to forward data is described in detail below with respect to FIG. 4.

The description above illustrates how compare logic 156, RFC 166 and multiplexer 154 operate to forward the newest storehit data in the pipeline 100. That is, storehit data in the E-stage 161 has highest priority, followed by the S-stage 171, followed by the W-stage 181, followed by data unit 144. For example, if a match occurs between the G-stage 151 load address and both the S-stage 171 and W-stage 181 store address, RFC 166 forwards the S-stage 171 store data because the S-stage 171 has the newest data. Similarly, if a storehit occurs between the G-stage 151 and both the E-stage 161 and the S-stage 171, then the data is forwarded directly from the E-stage 161 rather than the S-stage 171 since the data in the E-stage 161 is newer than the S-stage 171.

Figure 4:
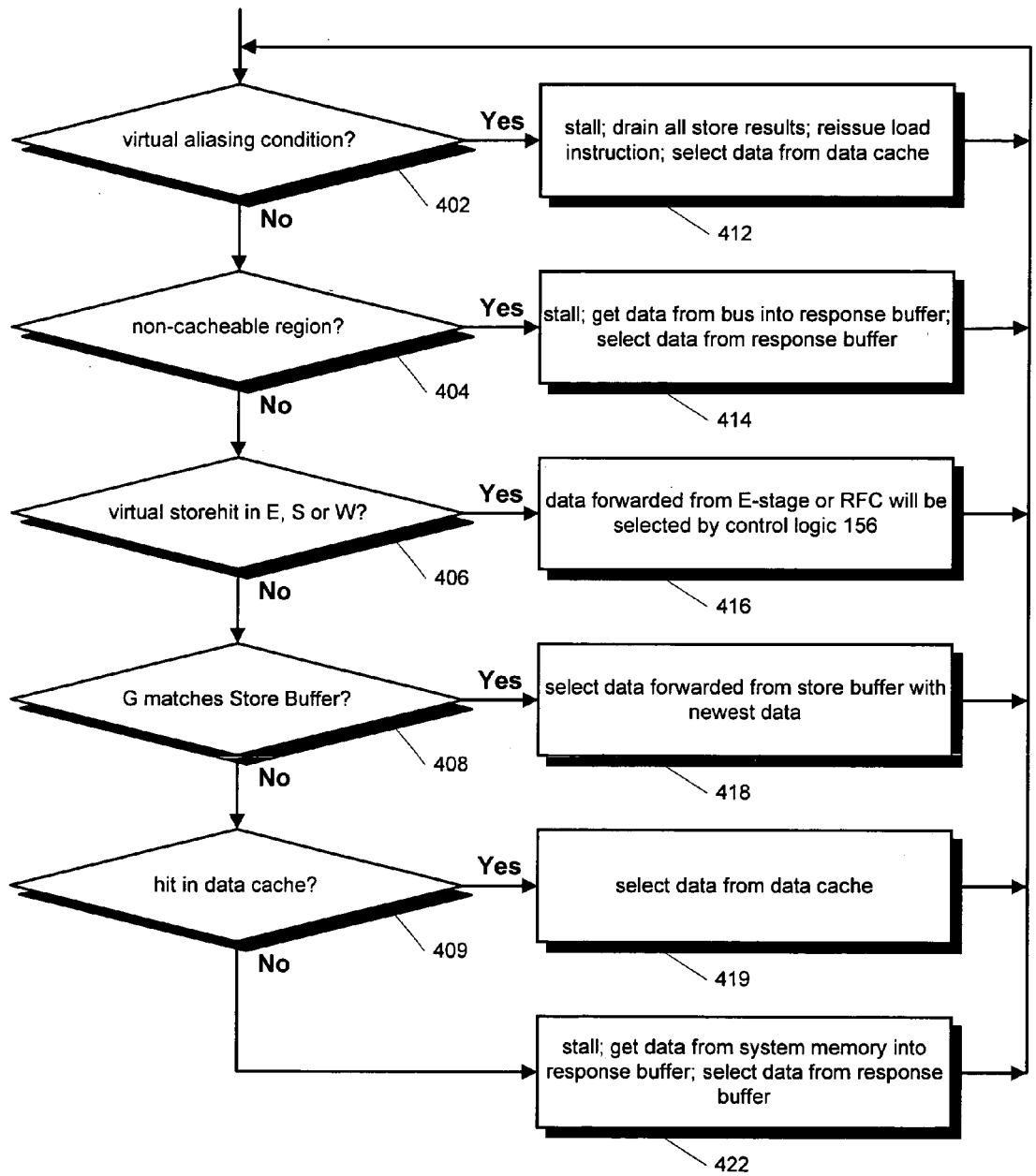
FIG. 4 is a flow chart illustrating operation of the data unit of FIG. 1 according to the present invention.

Referring now to FIG. 4, a flow chart illustrating operation of the data unit 144 of FIG. 1 according to the present invention is shown. Control logic 218 of FIG. 2 determines whether a virtual aliasing condition has occurred, in step 402. In general, a virtual aliasing condition occurs where no storehits are detected based on a virtual address comparison, but storehits are detected based on a physical address comparison. In particular, a virtual aliasing condition occurs where virt_match signal 159 indicates no matches between the G-stage 151 virtual load address and any of the E-stage 161, S-stage 171 or W-stage 181 virtual store addresses, but phys_match signal 263 indicates a match between the G-stage 151 physical address and one of the E-stage 161, S-stage 171 or W-stage 181 physical store addresses. A virtual aliasing condition may occur due to the fact that multiple virtual addresses may translate to the same physical address in a virtual memory system, such as a paged-memory system.

If a virtual aliasing condition occurs, compare logic 156 will have executed step 318 of FIG. 3 and incorrectly speculatively forwarded data from data unit 144 because compare logic 156 did not detect a storehit with any of the E-stage 161, S-stage 171 or W-stage 181, in steps 302, 304 or 306, respectively. That is, compare logic 156 will have forwarded data from the data unit 144 that is older than storehit data present in the E-stage 161 or in the RFC 166, and must be corrected. Hence, if a virtual aliasing condition is detected during step 402, control logic 218 asserts the Stall signal 267 to stall the E-stage 161 and all stages in the pipeline 100 above the E-stage 161, in step 412.

Stalling the pipeline 100 allows the stages below the E-stage 161 to drain all store results in the pipeline 100, in step 412. In particular, store results in the S-stage 171, W-stage 181 and store buffers 188 are written to data cache 242 of FIG. 2. After all the store results in pipeline 100 are drained, the load instruction causing the storehit and virtual aliasing condition is reissued within the data unit 144, in step 412. How data unit 144 reissues instructions is described in more detail in U.S. Pat. No. 6,549,985, entitled METHOD AND APPARATUS FOR RESOLVING ADDITIONAL LOAD MISSES AND PAGE TABLE WALKS UNDER ORTHOGONAL STALLS IN A SINGLE PIPELINE PROCESSOR, having the same assignee, which is hereby incorporated by reference. Because no storehits will occur in the pipeline 100 upon reissue of the load instruction due to the draining of the pipeline 100, compare logic 156 will select data unit 144, and control logic 218 will control multiplexers 252 and 256 to select data from data cache 242, in step 412.

Because virtual aliasing conditions typically occur relatively infrequently, the stall condition penalty incurred during step 412 is advantageously outweighed by the potentially large benefits of speculatively forwarding data based on virtual address comparison, rather than waiting an additional clock cycle to perform physical address comparison.

If no virtual aliasing condition is detected, control logic 218 determines whether the G-stage 151 load address is within a non-cacheable region as specified by signal 261, in step 404. If a storehit occurred and the load access was to a non-cacheable region, then storehit data will have been incorrectly speculatively forwarded, and must be corrected. Hence, if an access to a non-cacheable region is detected during step 404, control logic 218 asserts the Stall signal 267 to stall the E-stage 161 and all stages in the pipeline 100 above the E-stage 161, in step 414. Data unit 144 fetches data specified by the load address from processor bus 148 into a response buffer 296, in step 414. Typically, the data will be fetched from a memory-mapped I/O device 194. Once the data has been fetched into the response buffer 296, control logic 218 controls multiplexers 252 and 256 to select data from the response buffer 296, in step 414.

Because accesses to non-cacheable regions typically occur relatively infrequently, the stall condition penalty incurred during step 414 is advantageously outweighed by the potentially large benefits of speculatively forwarding data based on virtual address comparison, rather than waiting an additional clock cycle to perform physical address comparison by the MRD 216.

If no access to a non-cacheable region is detected, control logic 218 determines whether a virtual storehit was detected in the E-stage 161, S-stage 171 or W-stage 181, based upon a virtual address comparison as indicated by signal virt_match 159, in step 406. If a virtual storehit was detected, then compare logic 156 will not select data from data unit 144, but instead will select data forwarded directly from the E-stage 161 or from the RFC 166, in step 416.

If no virtual storehit was detected, then control logic 218 determines whether the G-stage 151 physical load address matches a store buffer physical address 228, as indicated by signal match_SB 265, in step 408. If a storehit with a store buffer 188 is detected, then control logic 218 controls multiplexers 254 and 256 to select data from the store buffer 188 with the newest data matching the load address, in step 418.

If no storehit with a store buffer 188 is detected, then control logic 218 determines whether the load address hit in the data cache 242, as indicated by cache hit signal 269, in step 409. If a cache 242 hit occurred, then control logic 218 controls multiplexers 252 and 256 to select data from data cache 242, in step 419.

If no data cache 242 hit occurred, then the data specified by the G-stage 151 load instruction is not present in the pipeline 100 and must be fetched from system memory or I/O device 194, in step 422. Control logic 218 generates Stall signal 267 to stall the pipeline 100 from the E-stage 161 upward, in step 422. While the pipeline 100 is stalled, data unit 144 fetches the data specified by the load address from system memory or I/O device 194 into a response buffer 296, in step 422. Once the data has arrived in the response buffer 296, control logic 218 controls multiplexers 252 and 256 to select data from the response buffer 296, in step 422.

The descriptions of FIGS. 3 and 4 above illustrate how compare logic 156, RFC 166, multiplexer 154 and data unit 144 operate in a hierarchical manner to forward the newest storehit data in the pipeline 100. Advantageously, address comparison logic is simplified due to the hierarchical nature of the logic that performs the various address comparisons. This "divide and conquer" notion of detecting storehits simplifies the detection logic, thereby easing timing constraints within the pipeline 100.

Referring now to FIGS. 5 through 8 generally, tables with exemplary instruction sequences illustrating operation of the microprocessor 100 of FIG. 1 according to the flowcharts of FIGS. 3 and 4 according to the present invention is shown. The leftmost column of the tables specify a clock cycle. The remaining columns specify the instruction contents, including load or store addresses, of the A-stage 131 through the W-stage 181 and store buffers 188 of pipeline 100 of FIG. 1, as indicated in the top row of the table. Load instructions, denoted by "ld R4, [MA1]" for example, specify a load of load data at a load address MA1 in system memory or I/O Device 194 into a register R4 in register file 124. Store instructions, denoted by "st [MA1],R2" for example, specify a store of store data from register R2 in register file 124 to a store address MA1 in system memory or I/O Device 194. Other instructions specified in the tables include add instructions, subtract instructions and no-operation instructions (indicated by "nop").

Referring now to FIG. 5, a table with an exemplary instruction sequence illustrating forwarding of storehit data from RFC 166 of FIG. 1 is shown. Clock cycles 1 through 8 are shown. During clock cycle 1, a store instruction storing data from a register to memory 194 proceeds down pipeline 100 of FIG. 1 into the A-stage 131 where a virtual store address is generated for the store instruction.

During clock 2, the store instruction proceeds to the D-stage 141 and another instruction, a NOP, proceeds to the A-stage 131. The virtual store address 143 of the store instruction is provided to the data unit 144 of FIG. 2 during clock 2 that is used to generate a physical address during clock 3.

During clock 3, the store instruction proceeds to the G-stage 151, the NOP proceeds to the D-stage 141 and a load instruction loading data from the same load address in memory 194 as the store address specified by the store instruction into a register in register file 124 proceeds to the A-stage 131, i.e., the load and store address match and thus constitute a storehit condition. In the example of FIG. 5, the load and store instructions specify the same virtual address, and therefore translate to the same physical address.

During clock 4, the store instruction proceeds to the E-stage 161, where a result is generated and written into RFC 166 and result register 174. In one embodiment, the execution unit 164 performs a non-modifying operation on the store data from register R2, such as a Boolean OR operation with zero. In another embodiment, the store instruction is part of a ld-alu-st instruction, as described in the above-referenced co-pending U.S. Patent Application, PAIRING OF LOAD-ALU-STORE WITH CONDITIONAL BRANCH, wherein execution unit 164 performs an arithmetic or logical operation on the store data. The load instruction proceeds to the D-stage 141 where its virtual load address is made available to the data unit 144 for translation into a physical address 271 during clock 5. Also during clock 4, compare logic 156 compares load address 143 with store address 163 in step 304 of FIG. 3 to determine if a storehit has occurred based on a virtual address comparison and the comparison results are saved for use in the next clock cycle.

During clock 5, each of the instructions proceeds to the next stage in the pipeline 100. Compare logic 156 detects the storehit condition between the G-stage 151 load and the S-stage 171 store in step 304 of FIG. 3 and controls multiplexer 154 to select the newest data forwarded from RFC 166 in step 314 of FIG. 3.

During clock 6, each of the instructions proceeds to the next stage in the pipeline 100. In particular, the load instruction proceeds to the E-stage 161 where the storehit data forwarded from RFC 166 is provided as one of the operands to execution unit 164. In one embodiment, the execution unit 164 performs a non-modifying operation on the load data, such as a Boolean OR operation with zero. In another embodiment, the store instruction is part of a ld-alu or ld-alu-st instruction, as described in the above-referenced co-pending U.S. Patent Application, PAIRING OF LOAD-ALU-STORE WITH CONDITIONAL BRANCH, wherein execution unit 164 performs an arithmetic or logical operation on the load data.

During clock 7, each of the instructions proceeds to the next stage in the pipeline 100.

During clock 8, each of the instructions proceeds to the next stage in the pipeline 100. In particular, the load instruction load data, namely the storehit data forwarded from RFC 166, is written back into R3 of register file 124.

Referring now to FIG. 6, a table with an exemplary instruction sequence illustrating forwarding of storehit data from a store buffer 188 of FIG. 1 is shown. Clock cycles 1 through 12 are shown. During clock cycle 1, a first store instruction specifying a store address proceeds to the A-stage 131.

During clock 2, the first store instruction proceeds to the D-stage 141 and a second store instruction, specifying the same store address as the first store instruction, proceeds to the A-stage 131.

During clock 3, the store instructions proceed down the pipeline 100 and a first add instruction proceeds to the A-stage 131. During clock 4, the instructions proceed down the pipeline 100 and a second add instruction proceeds to the A-stage 131. During clock 5, the instructions proceed down the pipeline 100 and a first subtract instruction proceeds to the A-stage 131. During clock 6, the instructions proceed down the pipeline 100 and a second subtract instruction proceeds to the A-stage 131.

During clock 7, the instructions proceed down the pipeline 100 and a load instruction specifying the same load address as the two store instructions proceeds to the A-stage 131. The two add and subtract instructions do not involve data related to the store instructions or to the load instruction. However, the add and subtract instructions generate results that are written into the RFC 166. During clock 7, the store results of the first store instruction are written into a store buffer 188.

During clock 8, the instructions proceed down the pipeline 100. The store results of the second store instruction are written into a different store buffer 188 than was written into by the first store instruction.

During clock 9, the instructions proceed down the pipeline 100. In particular, the load instruction proceeds to the G-stage 151. Compare logic 156 determines in steps 302, 304 and 306 if the G-stage 151 load address matches any of the E-stage 161, S-stage 171 or W-stage 181 store addresses, respectively and finds that they do not because no store instructions are presently in those stages. Therefore, compare logic 156 selects data forwarded from data unit 144, in step 318 of FIG. 3, for provision to execution units 164. Control logic 218 of FIG. 2 determines that the conditions in steps 402, 404 and 406 are not present, but that in step 408 the G-stage 151 physical load address 271 matches two store buffer 188 physical addresses 279. Therefore, control logic 218 controls multiplexers 254 and 256 to select data from the store buffer 188 with the newest data, i.e., the store buffer 188 with the store data results from the second store instruction, in step 418.

During clocks 10, 11 and 12, the instructions proceed three stages down the pipeline 100. In particular, during clock 12 the load instruction proceeds to the W-stage 181 where the load data, namely the storehit data forwarded from the store buffer 188 with the storehit data from the second store instruction, is written back into R9 of register file 124.

Referring now to FIG. 7, a table with an exemplary instruction sequence illustrating speculative forwarding of storehit data with a correction due to occurrence of a virtual aliasing condition is shown. Clock cycles 1 through 7 and n−1 through n+4 are shown. During clock cycle 1, a store instruction specifying a store address proceeds to the A-stage 131.

During clock cycle 2, the store instruction proceeds to the D-stage 141 and a load instruction specifying a load address having a different virtual load address from the virtual store address but which translates to the same physical address proceeds to the A-stage 131. That is, the load instruction generates a virtual aliasing condition with the store instruction since their virtual addresses do not match but their physical addresses do match. During clock cycle 3, the two instructions proceed down the pipeline 100.

During clock cycle 4, the load instruction proceeds to the G-stage 151. Compare logic 156 determines in steps 302, 304 and 306 of FIG. 3 that no match between the G-stage 151 virtual load address and virtual store address of the E-stage 161, S-stage 171 or W-stage 181 was found.

During clock 5, the store instruction proceeds to the S-stage 171 and the load instruction proceeds to the E-stage 161. Compare logic 156 controls multiplexer 154 to select data forwarded from data unit 144 during step 318 of FIG. 3 because no storehits were found based on a virtual address comparison. That is, compare logic 156 speculatively forwards data from data unit 144 due to the absence of a storehit based on the virtual address comparison. However, during step 402 of FIG. 4, control logic 218 detects the virtual aliasing condition and stalls the pipeline 100 above the S-stage 171, in step 412, since an erroneous speculative forwarding of data from data unit 144 was detected.

During clock 6, the store instruction proceeds to the W-stage 181 and the load instruction remains stalled in the E-stage 161.

During clock 7, the store instruction proceeds to the store buffers 188 where the store data is written into an available store buffer 188. The load instruction remains stalled in the E-stage 161 until clock n waiting for all store results from the pipeline 100 stages below the G-stage 151 to drain and for the store data of the store instruction to be updated in the data cache 242 of FIG. 2, in step 412.

During clock n, the load instruction is reissued by the data unit 144 back to the D-stage 141, in step 412. During clock n+1, the load instruction proceeds to the G-stage 151 where compare logic 156 detects no storehits since no store instructions are in the pipeline 100 below the G-stage 151. Consequently, compare logic 156 controls multiplexer 154 to select data from data unit 144, in step 318. Additionally, control logic 218 controls multiplexers 252 and 256 to select data from the data cache 242, in step 412.

During clock n+2, the load instruction proceeds to the E-stage 161 where the data from the data cache 242 is received by the execution units 164. That is, the data from the data cache is provided to correct for the incorrectly speculatively forwarded data during clock 5.

During clock n+3, the load instruction proceeds to the S-stage 171. During clock n+4, the load instruction proceeds to the W-stage 181 where the load data is written back to R4 of register file 124.

Referring now to FIG. 8, a table with an exemplary instruction sequence illustrating speculative forwarding of storehit data with a correction due to detection of a load from a non-cacheable memory region is shown. Clock cycles 1 through 7 and n−1 through n+2 are shown. During clock cycle 1, a store instruction storing data from a register to a memory-mapped I/O device 194 proceeds down pipeline 100 of FIG. 1 into the A-stage 131. During clock 2, the store instruction proceeds to the D-stage 141 and a nop proceeds to the A-stage 131.

During clock 3, the store and nop instructions proceed down the pipeline 100 and a load instruction specifying a load address that matches the store address of the store instruction proceeds to the A-stage 131. The load address is within a non-cacheable region specified in the MRD 216 of FIG. 2. During clock 4, the three instructions proceed down the pipeline 100.

During clock 5, the load instruction enters the G-stage 151 where compare logic 156 detects a storehit between the G-stage 151 virtual load address and the S-stage 171 virtual store address, in step 304 of FIG. 3. Also, during clock 5, control logic 218 detects the load address accessing a non-cacheable region, in step 404.

During clock 6, the load instruction proceeds to the E-stage 161, and compare logic 156 controls multiplexer 154 to select data forwarded from RFC 166, in step 314, since a storehit was detected in step 304. That is, compare logic 156 speculatively forwards the storehit data from RFC 166 to execution units 164. In addition, control logic 218 asserts stall 267 to stall the pipeline 100 above the S-stage 171, in step 414, in order to correct the erroneous speculative forwarding of storehit data from an address in non-cacheable region, as was detected in step 404.

During clock 7, the store and nop instructions proceed down the pipeline 100. However, the load instruction is stalled in the E-stage 161 until clock n, waiting for the store data to be written to memory-mapped I/O device 194 and for the load data to be fetched from I/O device 194 into a response buffer 296, in step 414.

During clock n, control logic 218 controls multiplexers 252 and 256 to forward the load data from the response buffer 296 for provision to the execution units 164, in step 414. During clock n+1, the load instruction proceeds to the S-stage 171. During clock n+2, the load instruction proceeds to the W-stage 181, where the load data is written back to register R3 of register file 124.

Although the present invention and its objects, features, and advantages have been described in detail, other embodiments are encompassed by the invention. For example, the size of the RFC and number of virtual address comparators may be scaled to support an extension to the number of stages added to the pipeline. Similarly, more store buffers could be added and the number of store buffer address comparators could be increased accordingly.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. An apparatus for speculatively forwarding storehit data in a microprocessor pipeline, the apparatus comprising:
   first and second virtual address comparators, for comparing a virtual load address with first and second virtual store addresses to generate a virtual match signal for indicating whether first and second storehit data is likely present in a store buffer and a result forwarding cache, respectively, of the microprocessor, wherein if said first and second storehit data are both present said second storehit data is newer than said first storehit data;
   first and second physical address comparators, for comparing a physical load address translated from said virtual load address with first and second physical store addresses translated from said plurality of virtual store addresses to generate a physical match signal for indicating whether said first and second storehit data is certainly present in said store buffer and said result forwarding cache, respectively;
   forwarding logic, coupled to receive said virtual match signal, for forwarding said second storehit data present in said store buffer in response to said virtual match signal indicating no match between said virtual load address and said second virtual store addresses but not a match between said virtual load address and said first virtual store address, prior to generation of said physical match signal; and
   control logic, for receiving said virtual and physical match signals and generating a stall signal for stalling the pipeline subsequent to said forwarding logic forwarding said storehit data from said store buffer if said physical match signal indicates a match between said physical load address and said second physical store addresses although said virtual match signal previously indicated no match between said virtual load address and said second virtual store addresses, until correct data specified by said physical load address is provided to replace said previously forwarded second storehit data.

2. The apparatus of claim 1, further comprising:
   a data unit, configured to forward said correct data specified by said physical load address to replace said previously forwarded second storehit data;
   wherein said control logic is configured to deassert said stall signal after said data unit forwards said correct data.

3. A method for speculatively forwarding storehit data in a microprocessor pipeline, the method comprising:
   determining that a virtual load address matches a first virtual store addresses present in the pipeline to indicate first storehit data is likely present in a store buffer of the microprocessor, but does not match a second virtual store address present in the pipeline to indicate second newer storehit data is likely absent in a result forwarding cache of the microprocessor;
   forwarding the first storehit data from a first stage comprising the store buffer to a second stage of the pipeline having a load instruction specifying the load address based on said determining that the first storehit data is likely present in the store buffer and the second newer storehit data is likely absent in the result forwarding cache;
   detecting that a physical load address translated from said virtual load address matches a physical store address translated from the second virtual store address to indicate the second newer storehit data is certainly present in the result forwarding cache, subsequent to said forwarding the first storehit data; and
   stalling the pipeline in response to said detecting that said physical load address translated from said virtual load address matches said physical store address present in the pipeline, until correct data specified by said physical load address is provided to replace the previously forwarded second newer storehit data.

4. The method of claim 3, further comprising:
   forwarding correction data from a third stage of the pipeline to said second stage after said stalling the pipeline; and
   unstalling the pipeline after said forwarding said correction data.

5. The method of claim 3, wherein said storehit data comprises a store instruction result within the pipeline having an identical physical store address as said physical load address.

6. A method for speculatively forwarding storehit data in a microprocessor pipeline, the method comprising:
   comparing a virtual load address with first and second virtual store addresses, wherein a load instruction specifying the virtual load address is newer than a first store instruction specifying the first virtual store address, which is newer than a second store instruction specifying the second virtual store address;
   speculatively forwarding a result or the first store instruction to the load instruction, in response to said comparing indicating the virtual load address matches the first virtual store address and mismatches the second virtual store address;

comparing a physical load address with a physical store address, wherein the physical load address is a translation of the virtual load address, wherein the physical store address is a translation of the second virtual store address;

determining said forwarding the result of the first store instruction to the load instruction was incorrect, after said speculatively forwarding the result of the first store instruction, in response to said comparing indicating the physical load address matches the physical store address; and forwarding a result or the second store instruction to the load instruction, in response to said determining.

7. The method or claim 6, wherein said comparing the virtual load address with the first virtual store address comprises determining whether the virtual load address hits in a data cache of the microprocessor, wherein said speculatively forwarding the result of the first store instruction to the load instruction comprises the data cache providing the result or the first store instruction to the load instruction.

8. The method of claim 6, further comprising:
stalling the pipeline, in response to said determining, until said forwarding the result of the second store instruction to the load instruction.

9. The method of claim 6, further comprising:
writing the result of the second store instruction to a data cache of the microprocessor, in response to said determining;

wherein said forwarding the result of the second store instruction to the load instruction comprises the data cache providing the result or the second store instruction to the load instruction.

10. The method of claim 6, further comprising:
reissuing the load instruction, in response to said determining.

11. The method of claim 10, wherein said reissuing the load instruction comprises providing the virtual load address to a data cache of the microprocessor from a replay buffer or the microprocessor.

12. The method or claim 6, wherein said comparing the virtual load address with the second virtual store address is performed prior to the result of the second store instruction being stored a store buffer of the microprocessor.

13. The method of claim 6, wherein said speculatively forwarding the result of the second store instruction to the load instruction comprises forwarding the result of the second store instruction from a result forwarding cache (RFC) or the microprocessor.

14. The method of claim 13, further comprising:
caching the result or the second store instruction in the RFC, prior to said comparing the virtual load address with the second virtual store address.

15. The method of claim 14, further comprising:
caching a result of a non-store instruction in the RFC, prior to said comparing the virtual load address with the second virtual store address.

* * * * *

UNITED STATES PATENT AND TRADEMARK OFFICE
CERTIFICATE OF CORRECTION

PATENT NO. : 7,065,632 B1
APPLICATION NO. : 09/545040
DATED : June 20, 2006
INVENTOR(S) : Gerard M. Col and G. Glenn Henry It is certified that error appears in the above-identified patent and that said Letters Patent is hereby corrected as shown below:

<u>Title Page</u>
Insert Item -- [74] Attorney, Agent or Firm

E. Alan Davis
James W. Huffman --

Insert Item -- [73] Assignee

IP-First, LLC       Fremont, CA --

Signed and Sealed this

Fifth Day of June, 2007

JON W. DUDAS
*Director of the United States Patent and Trademark Office*